July 15, 1969 R. C. WILSON 3,455,559

HEAD SHIFT ALIGNMENT MECHANISM

Filed April 29, 1966

INVENTOR.
REX C. WILSON
BY Fulwider, Patton, Rieber, Lee, and Utecht
ATTORNEYS

United States Patent Office 3,455,559
Patented July 15, 1969

3,455,559
HEAD SHIFT ALIGNMENT MECHANISM

Rex C. Wilson, Granada Hills, Calif., assignor to Muntz Stereo-Pak, Inc., Van Nuys, Calif., a corporation of California Filed Apr. 29, 1966, Ser. No. 546,321
Int. Cl. G11b 5/56
U.S. Cl. 274—4 1 Claim

ABSTRACT OF THE DISCLOSURE

Apparatus for aligning a recording head with recorded tracks of a magnetic tape and including three spaced apart alignment guides for a head mounting plate, the guides being vertically adjustable to vary the height and level of the plate. A fourth vertically adjustable guide selectively engages camming means to shift the head from a first aligned vertical position to a second aligned vertical position.

The present invention relates to improvements in tape recording and playback machines and, more particularly, to a novel mechanism for aligning a recording or playback head with a tape in a recording or playback machine.

In both the recording and playback of information on magnetic tapes, it is extremely important that the record and playback heads be properly aligned with the tape. In particular, any misalignment of the head with the tape will result in loss of both volume and frequency response.

For proper alignment to be achieved, the face of the head must be both vertically and horizontally aligned with the tape over each recording track. Vertical alignment is usually achieved by carefully positioning the face of the head in a plane parallel to the tape as it passes thereover. Horizontal alignment is often achieved by turning the head about a horizontal support screw for the head. Unfortunately when the support screw is tightened to hold the head in place, the head often turns slightly with the screw and misalignment results.

Accordingly, it is an object of the present invention to provide an improved mechanism for assuring proper head alignment in a tape player.

Another object of the present invention is to provide a head alignment mechanism which is simple in design, inexpensive to manufacture, and easy to assembly and adjust, even for unskilled personnel.

The foregoing, as well as other objects and advantages of the present invention, may be more clearly understood by reference to the following detailed description, when considered with the drawing which, by way of example only, illustrates one form of head adjustment mechanism embodying features of the present invention.

Figures 1, 2:
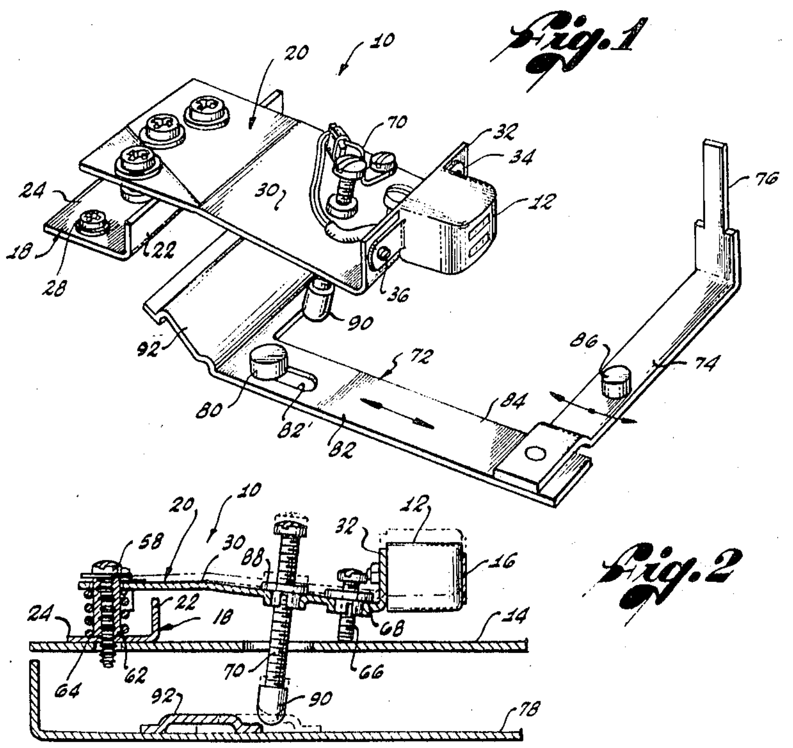
FIGURE 1 is a perspective view of the adjustment mechanism.
FIGURE 2 is a sectional side view of the adjustment mechanism illustrated in FIGURE 1.
Figure 3:
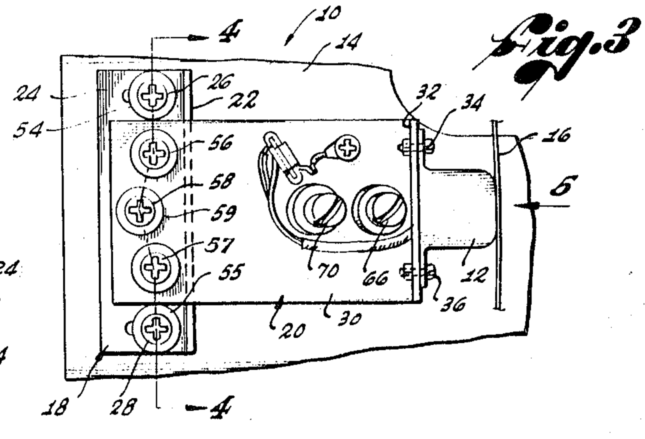
FIGURE 3 is a plan view of the adjustment mechanism.
Figure 4:
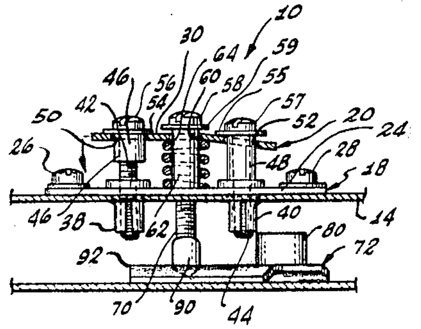
FIGURE 4 is a sectional view taken along the line 4—4 of FIGURE 3.

In the drawing, the alignment mechanism is represented generally by the numeral 10 and is adapted to adjust the position of a playback or record head 12 above the top of a deck 14 and to insure that the head is at all times in proper horizontal and vertical alignment with different recording tracks on a tape 16.

To accomplish the foregoing, the mechanism 10 includes a mounting bracket 18 and a head support bracket

20. The mounting bracket 18 is generally L-shaped, comprising a vertical, front flange 22 and a flat rear plate 24, overlying the top of the deck 14 and secured thereto by a pair of screws 26 and 28.

The head supporting bracket 20 is also generally L-shaped, including a flat, rear plate 30 and a vertical, upwardly extending front flange 32. The head 12 is releasably connected by nut-bolt combinations 34 and 36 to the flange 32 such that the front face of the head lies in a vertical plane substantially parallel to the surface of the tape 16. The plate 30, on the other hand, is effectively spring-loaded and cantilevered from the mounting bracket 18.

To provide such support for the plate 30, two clinch nuts 38 and 40 are connected to and extend through openings in the flat plate 24 of the bracket 18. The clinch nuts 38 and 40 are laterally spaced from each other on opposite sides of the head 12 and are adapted to threadedly receive screws 42 and 44.

The screws 42 and 44 extend vertically from the clinch nuts through spacer sleeves 46 and 48 and holes 50 and 52 in the rear portion of the plate 30. Above the plate 30, the screws pass through washers 54 and 55 and terminate in enlarged heads 56 and 57.

Th sleeve 46 is relatively short, containing the bottom of the washer 54 through the hole 50 and leaving space between its lower end and the top of the plate 24. The sleeve 48 is relatively long, and extends from the lower surface of the washer 55 to the top of the clinch nut 40. Thus arranged, the screws 42 and 44 and sleeves 46 and 48 act as vertical guide members for the head supporting bracket 20 above the deck 14, and the washers 54 and 55 and heads of the screws 42 and 44 act as upper stop members for limiting the vertical movement of the bracket.

In addition to the screws 42 and 44, a screw 58 extends downwardly through a washer 59, an opening 60 in the plate 30, and a spacer sleeve 62, and screws into and through the plate 24 midway between and slightly to the rear of the clinch nuts 38 and 40. A strong coil spring 64 extends around the sleeve 62 with one end bearing against the top of the plate 24 and an opposite end continuously pressing upward on the bottom of the plate 30. The coil spring 64 thus acts as spring means continuously urging the rear portion of the plate 30 upwardly along the guide members defined by the screws 42 and 44 and against the washers 54 and 55. Simultaneously, the spring continuously urges the front end of the plate 30 and the head 12 downwardly toward the top of the deck 14.

Figure 5:
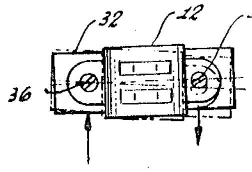
FIGURE 5 is a front view looking in the direction of the arrow in FIGURE 3.

With the spring-biased cantilever arrangement for the head supporting bracket 20, the tilt, azimuth or horizontal alignment of the head 12 is adjusted simply by turning the screw 42. In particular, a turning of the screw 42 either raises or lowers the head of the screw to raise or lower the rear corner of the plate 30 along the screw. At the same time, the spring 64 continues to exert an upward force on the plate 30 which pivots about the screw 44. The adjustment provided by the turning of the screw 42 for the head 12 is illustrated in FIGURE 5 wherein a lowering of the head of the screw 42 toward the deck 14 produces a downward tilting of the right side of the head 12 and a raising of the head of the screw 42 away from the deck 14 produces a raising of the right side of the head away from the deck.

In practice, the proper alignment of the head 12 with the tape 16 may be pre-set by running a test tape over the head. The test tape contains a constant frequency tone. By connecting suitable meters to the output of the head 12, the screw 42 may be turned until the volume and frequency response from the tape head are at maximum values. Once the proper alignment has been set, it need not be altered during normal operation of the associated tape player.

In addition to providing means for adjusting the tilt or azimuth of the head 12, the alignment mechanism 10 includes means for establishing a first or lower vertical position for the head above the top of the deck 14 in alignment with a first track on the tape 16, as well as means for shifting the head between the first vertical position and a second vertical position where the head may be aligned with a second track on the tape.

In the illustrated form of the invention, the means for establishing the first or lower vertical position for the head 12 comprises a screw 66 threadedly received by a clinch nut 68 in the plate 30 immediately behind the flange 32. The screw 66 extends through the nut 68 to engage the top of the deck 14. By turning the screw 66 in the clinch nut 68 and in contact with the deck 14, the vertical position of the front end of the plate 30 and head 12 is adjusted to define the first or lower vertical position for the head in alignment with a first track on the tape 16.

The means for shifting the head 12 from the lower position to a second or raised position in alignment with a second track on the tape comprises a relatively long screw defining a shift arm 70, an L-shaped shift plate 72 and an actuating arm 74 pivotally connected to the plate 72 and having a vertically extending handle 76. The shift plate 72 is guided for fore and aft sliding movement along a bottom 78 of the associated tape player by a pin 80 riding in an elongated slot 82 in a leg portion 84 of the plate. The actuating arm 74 is also connected to the bottom plate 78 by a pivot pin 86.

As illustrated in FIGURES 1 and 2, the shift arm 70 is threadedly received by a clinch nut 88 in the plate 30 with one end extending above the top of the plate and an opposite end carrying a bumper foot 90 above the bottom plate 78 of the associated tape player. By turning the arm 70 relative to the clinch nut 88, the position of the bumper foot 90 below the deck 14 may be selectively adjusted.

The bumper foot 80 is adapted to engage the raised foot 92 of the shift plate 72 as the foot slides rearward with the shift plate in response to forward movement of the handle 76. As the bumper rides up on the foot 92, the plate 30 and head 12 are raised to an upper position in alignment with a second track on the tape 16. As the foot moves forward with rearward movement of the handle 76, the bumper foot 80 moves to its lowered position to return the head 12 to its first vertical position under the action of the spring 64.

In the foregoing manner, the adjustment mechanism 10 provides improved means for selectively adjusting the vertical position of the head 12 as well as the tilt or azimuth of the head to insure proper alignment of the head with different recording tracks on the tape 16. This, the present invention accomplishes with an extremely simple design which is easy to assemble, and adjust to correctly position the head 12 above the top of the deck 14.

While a particular form of adjustment mechanism has been described in some detail herein, changes and modifications may be made in the illustrated form without departing from the spirit of the invention. It is therefore intended that the present invention be limited in scope only by the terms of the following claim.

I claim:

1. A mechanism for aligning a playback or recording head with a tape in a tape recording or playback machine, comprising:
   - a horizontally extending support member carrying said head at a forward end portion thereof;
   - first and second laterally separated guide means extending vertically from the deck of said machine on opposite sides of said head and through openings in a rear portion of said support member for guiding vertical movement of said support member over said deck;
   - spring means to the rear of said guide means for continuously urging said rear portion of said support member upwardly away from said deck and said front portion downwardly toward said deck;
   - selectively adjustable means for changing the vertical distance between a portion of said support member along one of said guide means and said deck to laterally tilt said head for horizontal alignment with said tape;
   - vertically adjustable stop means extending from the bottom of said support member for engaging the top of said deck adjacent said head to define a first vertical position for said head above said deck;
   - a vertically adjustable shift arm extending from said support member for raising and lowering said support member and head between said first and a second vertical position horizontally aligned with said tape; and
   - camming means for selectively engaging said shift arm to selectively move said head between said first and second vertical positions.

References Cited

UNITED STATES PATENTS 3,271,034 9/1966 Andrews ............. 274—4
3,155,359 11/1964 Hogan et al. ....... 179—100.2

FOREIGN PATENTS 1,071,964 12/1959 Germany.

BERNARD KONICK, Primary Examiner

JEROME P. MULLINS, Assistant Examiner

U.S. Cl. X.R.

179—100.2